(12) United States Patent
Baldwin

(10) Patent No.: US 9,092,094 B1
(45) Date of Patent: Jul. 28, 2015

(54) OPTICAL EDGE TOUCH SENSOR

(75) Inventor: Leo B. Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 432 days.

(21) Appl. No.: 13/240,993

(22) Filed: Sep. 22, 2011

(51) Int. Cl.
*G06F 3/033* (2013.01)
*G06F 3/042* (2006.01)

(52) U.S. Cl.
CPC ............ *G06F 3/0425* (2013.01); *G06F 3/0428* (2013.01)

(58) Field of Classification Search
CPC .... G06F 3/0425; G06F 3/0421; G06F 3/0428
USPC .................................................. 345/173–175
See application file for complete search history.

(56) References Cited

U.S. PATENT DOCUMENTS

| | | | |
|---|---|---|---|
| 5,825,352 A | 10/1998 | Bisset et al. | |
| 6,351,260 B1 | 2/2002 | Graham et al. | |
| 6,788,295 B1 | 9/2004 | Inkster | |
| 7,551,814 B1 | 6/2009 | Smits | |
| 2002/0015573 A1 | 2/2002 | Ishibashi | |
| 2004/0212603 A1* | 10/2004 | Cok | 345/175 |
| 2008/0029691 A1* | 2/2008 | Han | 250/224 |
| 2008/0146285 A1* | 6/2008 | Lee et al. | 455/566 |
| 2009/0128499 A1* | 5/2009 | Izadi et al. | 345/173 |
| 2009/0189878 A1* | 7/2009 | Goertz et al. | 345/175 |
| 2010/0287470 A1 | 11/2010 | Homma et al. | |
| 2010/0302185 A1 | 12/2010 | Han et al. | |

OTHER PUBLICATIONS

"Non-Final Office Action dated Jul. 29, 2013," U.S. Appl. No. 13/297,127, 36 pages.
"Final Office Action dated Dec. 30, 2013," U.S. Appl. No. 13/297,127, 37 pages.
"Non-Final Office Action dated Apr. 24, 2014," U.S. Appl. No. 13/297,127, 40 pages.

* cited by examiner

*Primary Examiner* — Charles V Hicks
*Assistant Examiner* — Charles Zheng
(74) *Attorney, Agent, or Firm* — Novak Druce Connolly Bove + Quigg LLP

(57) ABSTRACT

An optically transmissive element of a computing device can be used to enable touch input. One or more light sources, such as infrared (IR) light emitting diodes (LEDs), can direct radiation into an edge or side of the transmissive element and direct light to reflect from at least one other side or edge using total internal reflection (TIR). If a user places a finger at a position where the light reflects from an edge of the element, a portion of the light will be transmitted out of the element causing a reduction in the amount of light received to one or more light sensors. By monitoring losses for one or more light sources across one or more light sensors, locations at which losses occur can be determined. These locations can correspond to various types of user input.

9 Claims, 7 Drawing Sheets

OPTICAL EDGE TOUCH SENSOR

BACKGROUND

As people are increasingly using portable computing devices for a wider variety of purposes, it can be advantageous to adapt the ways in which people interact with these devices. While various types of touch-free input are being used for a variety of purposes, there are still various types of inputs that many people like to provide using a physical contact approach. For example, a user holding a cell phone to that user's ear might like to adjust a volume during a call by pressing volume buttons or spinning a volume wheel. Similarly, a user holding a personal data assistant might want to select a line of text using a side of the device, without having to use the user's other hand to manually select that line through a touch screen or similar input. Due to the number of types of possible input, it can be prohibitively expensive and/or complex to attempt to place enough physical dials or buttons around a periphery of the device to provide the desired functionality. Further, an over abundance of input mechanisms can make the device seem difficult to operate, or at least can make the device less visually appealing, which can negatively impact sales.

BRIEF DESCRIPTION OF THE DRAWINGS

Various embodiments in accordance with the present disclosure will be described with reference to the drawings, in which.

DETAILED DESCRIPTION

Figure 1A:
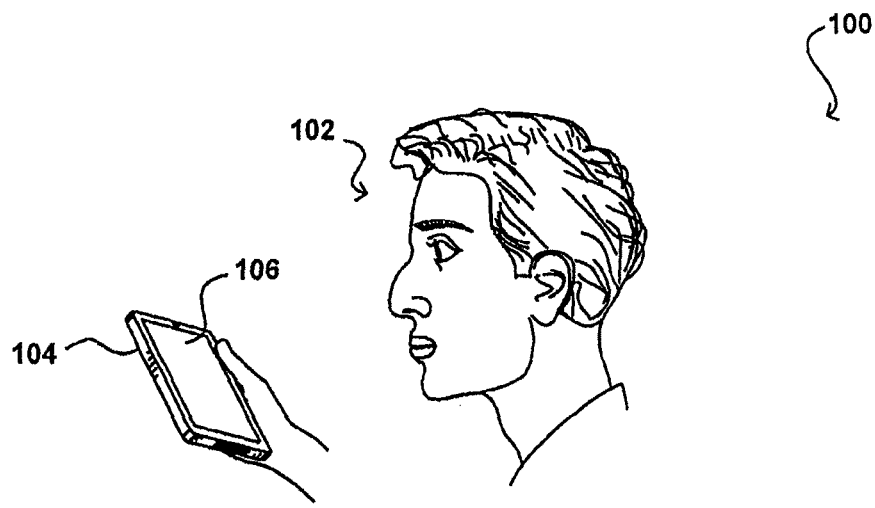
FIGS. 1(a) and 1(b) illustrates an example situation wherein a user is interacting with a computing device that includes a plurality of light emitting elements operable to generate light that is coupled out of a display screen to provide a pattern to be displayed on the device in accordance with various embodiments.

Systems and methods in accordance with various embodiments of the present disclosure may overcome one or more of the aforementioned and other deficiencies experienced in conventional approaches to providing input to, or determining information for, an electronic device. In particular, approaches discussed herein enable an electronic device to utilize an existing display element or other optically transparent component to determine one or more locations where the user is touching an edge or side of the element, in order to provide input to the device. In at least some embodiments, the device can also detect changes in pressure applied to the side of the element through changes in the detected contact area of the user's finger(s) with respect to the edge of the element.

In various embodiments, a set of light sources and a set of light sensors are positioned such that the light sources are each able to emit light into an edge of a layer of a display element and the light sensors are each able to detect at least a portion of that light when emitted from the same, or another, edge of that layer. It should be understood that in various embodiments the layer does not need to be part of a display element, and that in certain embodiments the layer may comprise the display element itself. The layer in at least some embodiments comprises a medium formed of an optically transmissive material, such as glass or a clear polymer, with substantially few optical defects or contaminants that could otherwise affect the transmission of radiation within the medium.

The light sources (which in some embodiments could comprise a single physical source with the light split into multiple beams or other such configurations) can be positioned and/or configured such that the light from each light source internally reflects off of at least one surface of the transmissive medium. The angle at which the light is incident on, and reflected from, the edge can be selected such that the light undergoes "total" internal reflection (TIR), whereby at least a majority of the light is reflected back into the medium with only a small amount of light being emitted from that edge due primarily to imperfections in the medium, contaminants on the edge, or other such issues. The light reflected back from the edge can then be detected by at least one light sensor. In some embodiments, the light might reflect off more than one edge before being incident on a sensor, or might be at least partially incident on multiple sensors along multiple edges of the medium.

Due to the difference in refractive indices between ambient air and the moisture, oils, and other materials present upon a user pressing a finger on the transmissive material, the amount of light reflected and transmitted by an edge can change based on the presence of a finger or similar object at the edge position at which a light path is incident. By monitoring changes in the intensity of light received to at least one respective light sensor, a computing device can determine whether (and when) a user contacted the edge at a given location. By using an array of light paths covering at least a substantial portion of at least one edge of the transmissive medium, the computing device can monitor various user interactions with the edge(s) and determine various types of user input to the device in response to those interactions.

Many other alternatives and variations are described and suggested below in relation to at least some of the various embodiments.

FIG. 1 illustrates an example situation 100 wherein a user 102 is interacting with a portable computing device 104. The computing device 104 can be any appropriate device, such as a smart phone, tablet computer, or personal data assistant. In this example, the user 102 is holding the device in the user's right hand. In many cases, the user can interact with one or more buttons on the side of the device, and depending on the size of the device can reach a portion of the keys on the front of the device or graphical elements displayed on a display screen 106. As mentioned, the number of buttons or physical input elements that can be placed on a side of the device can be limited due at least in part to space, visual appearance, or other such aspects. Further, if the user 102 uses the display element 106 to make selections the user must block at least a part of the display to provide input, and depending upon aspects such as the size and form factor of the device might have to use two hands to provide the desired input, which might be less than desirable for some users in at least certain situations.

Figure 1B:
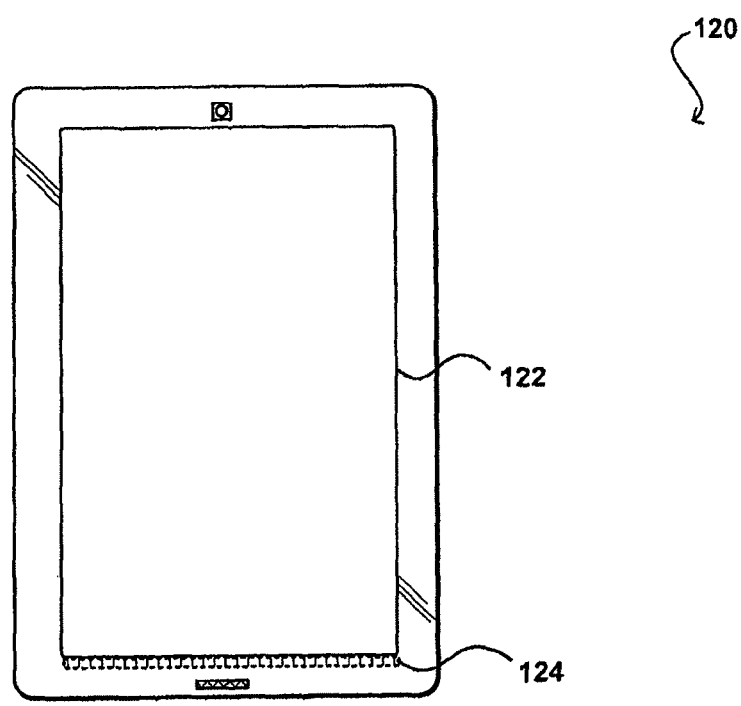

FIG. 1(b) shows an example of a computing device 120 that enables a user to enter information through contact with the front surface of a display element 122. As known in the art, a multi-layer display element can provide for pressure-based input through resistive or capacitive touch-based approaches. A resistive touch-based element typically detects a touch location by the contact location of two layers of a resistive material of the display element. A capacitive touch-based approach detects a touch location by determining the change in the electrostatic field of a display element in response to the touch of an electrical conductor, such as a human finger. The touch functionality is typically provide via layers that are distinct from the actual display layer, which can include a clear material having light from a light bar 124 coupled into it as known in the art.

While such elements could be used on the sides of a device such as that illustrated in FIG. 1(a), there can be various potential disadvantages to such an approach. For example, a resistive approach might require use of a material on the edge of the device that is at least partially susceptible to damage, similar to the display on a device. Oftentimes, users want the sides and back of the device to provide a relatively durable casing to prevent damage to the device upon dropping the device or another such occurrence, such that users might not want resistive touch layers on the sides of the device. Similarly, capacitive mechanisms may also be less durable, and may be affected by changes in temperature or other such variations.

It therefore can be desirable to provide a way for users to interact with one or more sides of the device to provide input, without significantly affecting the durability of the device or providing a number of different physical mechanisms that can be visually unappealing, potentially inconvenient to operate, and can potentially prevent use of protective casings or other such elements. It further can be desirable to utilize existing components and/or technology to the extent possible, in order to conserve volume in the device, lower production costs, and prevent unnecessarily complicating the device.

Figure 2:
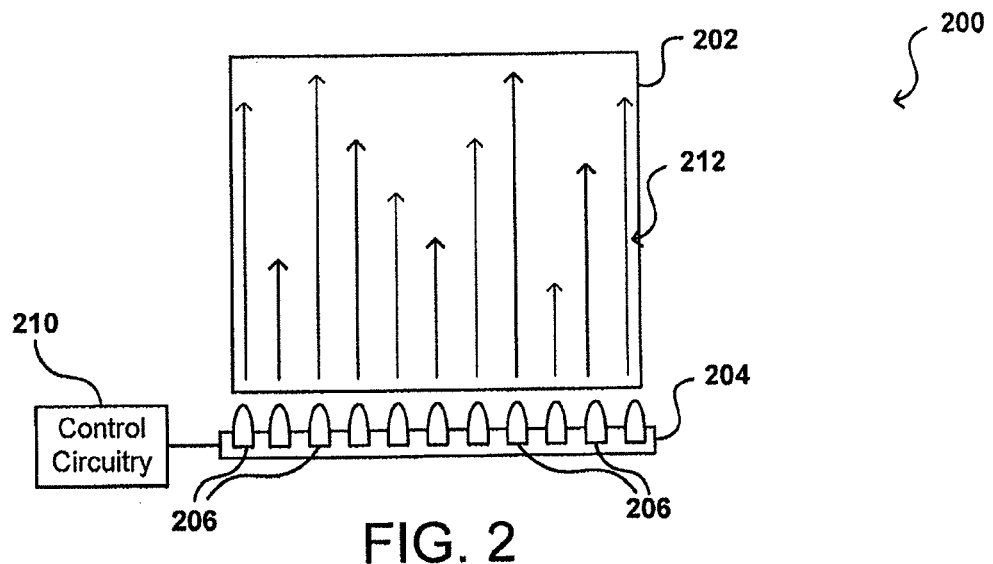
FIG. 2 illustrates an example of a light bar including a plurality of light emitting diodes LEDs positioned to direct light into a display element that can be used in accordance with various embodiments.

FIG. 2 illustrates an example configuration 200 of a light bar 204 and display element that can be used in accordance with various embodiments. As used herein, "light bar" can refer generically to any array or assembly of illumination elements that may or may not be connected to each other by a physical bar or other such assembly, but may simply be mounted on a printed circuit board (PCB) or flexible substrate, etc. In this example, the display element 202 is shown in a "top view" and the radiation 212 propagating through the display element is light (e.g., visible or infrared (IR)) from the light sources (e.g., LEDs) of the light bar. In conventional displays the light from the LEDs might be directed through a grating layer before being directed up and out of the display, which would be out of the plane of FIG. 2. It should be understood, however, that orientations and directions such as "up" and "front" when referring to a device are used for purposes of simplicity of explanation, and are not intended to require a certain orientation unless otherwise stated. In various embodiments, however, a light bar used for touch input might be positioned or configured such that the light is incident directly into a side of the transmissive material 202. In some embodiments, the same light bar might be used for the touch input as is used for the display, with one or more optical elements being used to direct light from one or more of the LEDs into a side of the transmissive element instead of into a grating or other component of the display.

The light bar 204 in this example includes a set of infrared LEDs 206, which can produce radiation that is undetectable to the human eye and can enable touch input to be provided without affecting the visible appearance of an image displayed on respective a computing device screen, or distracting the user with radiation emitted from one or more sides of the display. These LEDs can be driven by control circuitry 210 to direct light along determined paths in the transmissive medium, with the light from the various sources capable of being generated concurrently, one at a time, or in various other combinations as discussed or suggested elsewhere herein. In cases were a laser diode or similar element is used as discussed later herein, the same or separate circuitry can be used to separately drive the laser diode, as well as the light sources for image display, backlighting, and other such purposes. In some embodiments, the light bar 204 might include a set of IR LEDs placed between each adjacent pair of visible light LEDs used for image display.

In some embodiments, it can be desirable to separate the IR LEDs from the other LEDs, for any of a number of purposes such as space or heat concerns. In embodiments where multiple light bars are used, the separation of LEDs on different light bars further enables the different groups of LEDs to be controlled and activated separately, which can help to conserve power and reduce heat. For example, a right handed user might prefer to provide input on a different side of the device from a left handed holder, and applications such as games might require very different input than Web browsing or other such activities.

Figure 3:
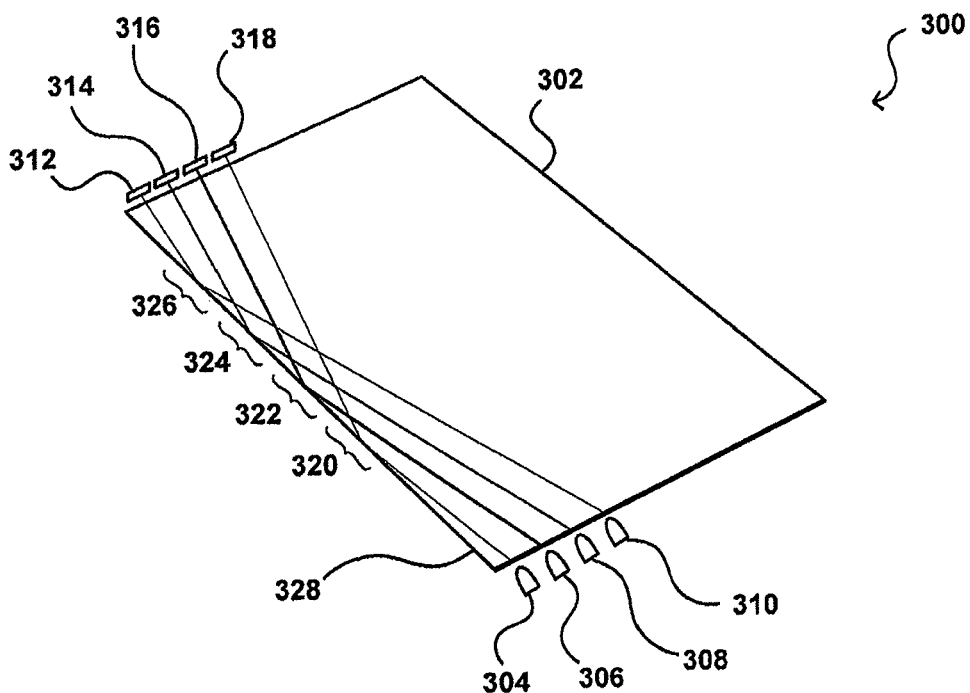
FIG. 3 illustrates a first configuration of light emitters and detectors for a display element that can be used in accordance with various embodiments.

FIG. 3 illustrates an example of a touch input configuration 300 that can be used in accordance with various embodiments to determine input for a single side of a computing device. It should be understood that such an approach could be used with any appropriate side or edge of the transmission medium, and that multiple such configurations can be used with the same medium in accordance with the various embodiments.

In this example, a set of light sources 304, 306, 308, 310 (e.g., LEDs) is positioned such that light emitted by the light sources is incident on a determined side or edge 328 of a transmissive medium 302, such as a glass or plastic layer of a display element. Although four light sources are shown, it should be understood that there can be any appropriate number of light sources selected based upon factors such as the size of the device, the desired amount of sensitivity, the amount of power required, the angular spread of the light emitted, and other such factors. Further, although the light from each source is shown as a collimated beam in this example, it should be understood that the beams shown correspond to a primary path direction for each light source, and that there can be varying amounts of beam spread among the various embodiments. In some embodiments, the beams might at least partially overlap each other during at least a portion of the path lengths. In some embodiments, lasers or other beam-emitting elements can be used that might generate a beam pattern such as the one that is displayed in FIG. 3.

In the configuration 300 of FIG. 3, the light sources 304, 306, 308, 310 are arranged such that light from each source is primarily incident along a determined portion 320, 322, 324, 326 of an edge 328 of the transmissive medium. The incident angles are selected such that, for an interface with ambient air or a similar environment, a substantial amount of the light from each light source undergoes TIR and is directed back into the transmissive medium at a corresponding angle of reflection. The reflected light is directed to be incident on at least one of a set of light sensors 312, 314, 316, 318 or other such elements (e.g., radiation detectors, IR sensors, or photodiodes). For example, the light from light source 304 is incident primarily in region 320, then reflected so as to be detected primarily by sensor 318. As should be apparent, some light from each source might be detected by other sensors as well due to factors such as beam spread, imperfections in the transmissive medium 302, and the like. In the case of imperfections in the medium or other aspects inherent to the particular elements, a calibration procedure can be used that takes into account the variations in intensity due to these elements. For example, if less light from one source is receive than from the other sources due to a bubble or crack in the transmissive element, for example, this different can be determined through a calibration procedure and used as a baseline or similar set of values from which variations will be measured.

As mentioned, the amount of light reflected internally from the edge of the medium is due at least in part to the difference in the indices of refraction between the transmissive medium 302 and the environment on the other side of the edge, which typically will be ambient air. Certain changes in that index can change the critical angle at which the light totally internally reflects, and can cause at least a portion of the light from that area to be transmitted through the edge instead of being reflected. For example, if a user places a finger within region 324, the oils, moisture, and other aspects of the user's finger can change the ratio of the refractive indices and the critical angle, reducing the amount of light reflected by the edge and ultimately received by at least one sensor 314. By knowing where along the edge 328 the light was reflected (region 324) the device (or a system or service in communication with the device) can determine where along the edge the user touched with a finger, within a given range of certainty. As the light can be most intense along a center portion of that region, variations in intensity reduction can occur due to factors such as the distance from the center point where the user touched and the size of the finger or region which is contacted. As discussed elsewhere herein, the amount of pressure applied by the finger can also affect the amount of light reflected, as placing more pressure with a finger along the edge will cause the contacting surface of the finger with respect to the transmissive medium to "spread out" and contact more of the edge, which can further decrease the amount of light reflected and ultimately received by the corresponding sensor.

Figure 4A:
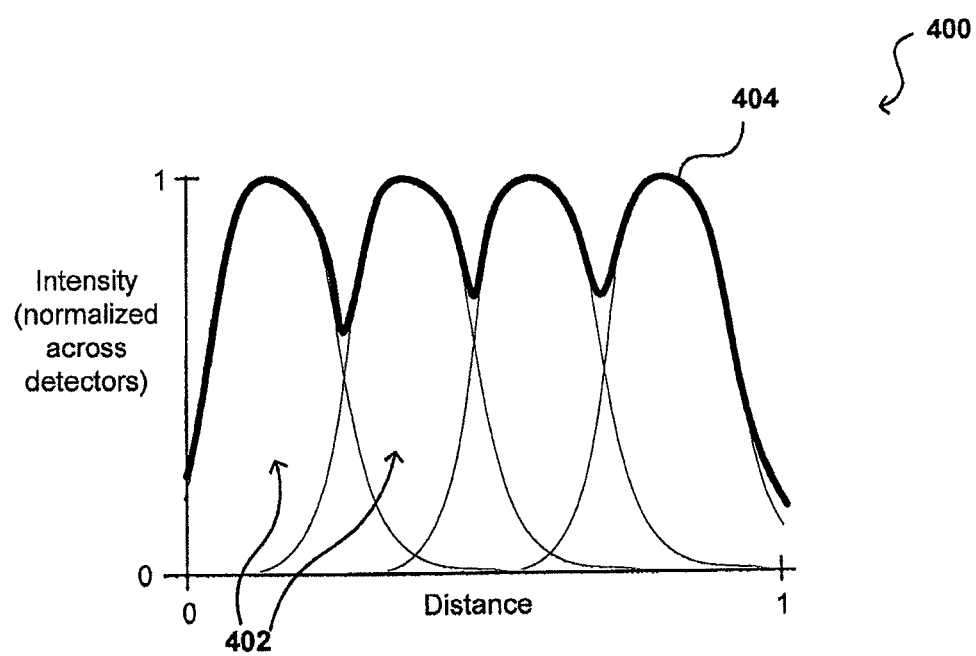
FIGS. 4(a) and 4(b) illustrate example intensity patterns that can be analyzed in accordance with various embodiments.
Figure 4B:
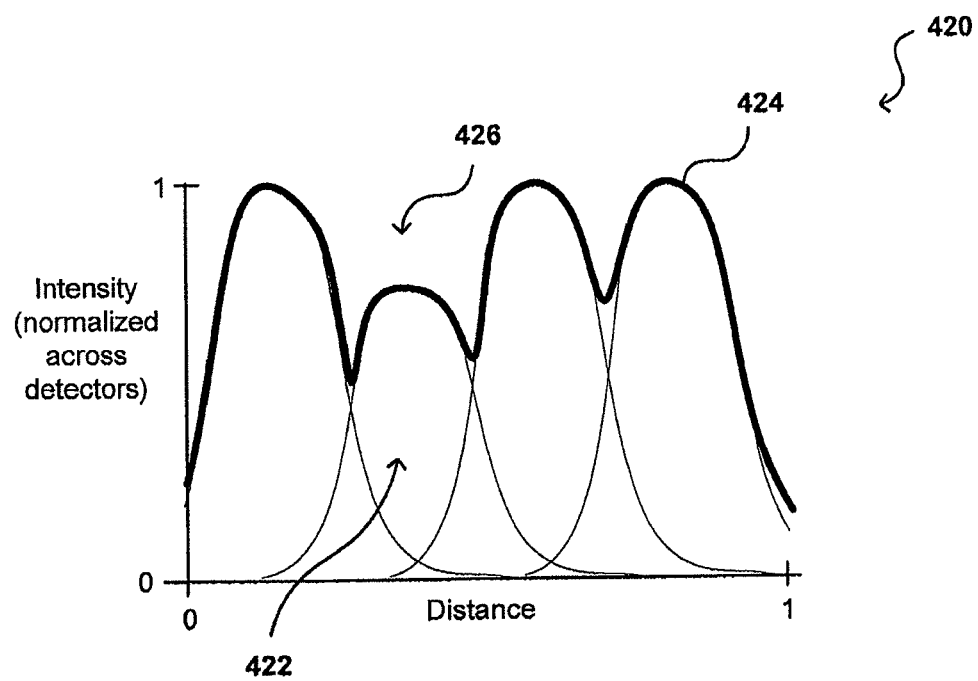

FIGS. 4(a) and 4(b) illustrate an example of how the measured intensity can be used to determine a place of input along an edge in accordance with various embodiments. In the plot 400 of FIG. 4(a), there are intensity curves 402 for each of four sensors. As discussed, each sensor can measure light reflected by an edge for a corresponding primary light source, with some amount of overlap in this example to provide for continuity in input location. The intensity information for each sensor has been calibrated and the results normalized such that when no finger or other such object is touching the edge, a relatively consistent intensity curve 404 is obtained by aggregating the measured intensity over distance, which also can be normalized to run from 0 to 1. The distance can be an edge distance or a distance across the array of sensors, which then can be correlated with an edge distance. It should be understood that the values do not need to be normalized in all embodiments, and various sensor selections and configurations can be used within the scope of the various embodiments.

FIG. 4(b) illustrates an example plot 420 illustrating a change in the overall intensity curve 424 in response to a user touching an area on an edge of the transmission medium from which the light is reflecting. In this example, the user has touched the edge in a location that is primarily located with light received by one of the sensors, resulting in a reduction in the intensity of light received by that sensor, as illustrated by the change in shape of the individual intensity curve 422 measured by that sensor. It should be understood that for overlapping sensor measurements and/or light reflection regions a finger location might cause a reduction in the measured intensity of two or more intensity curves. In at least some embodiments, the relative reduction in the intensity of two adjacent intensity curves can be used to interpolate the approximate position of the finger with respect to the two reflection regions associated with those sensors.

In at least some embodiments, the overall intensity curve 424 can be analyzed to determine one or more locations 426 where the intensity decreased, and by how much. This information can be used to determine where the edge was touched (based at least in part upon the path of the light associated with that position) and the amount of the edge that was contacted (as may be based at least in part upon the amount of reduction in intensity). In some embodiments, particularly where there are a large number of sensors or sensor elements, a relative intensity value measured by each element could be compared which can provide a more simple processing approach for a more complex physical system. Various other approaches can be used as well as should be apparent to one of ordinary skill in the art in light of the present disclosure.

As discussed, an approach such as that illustrated in FIG. 3 can be duplicated for at least one additional edge in order to provide touch input determinations on multiple edges. In at least some cases, however, this may require additional sensors and/or light sources, or at least additional elements operable to selectively direct light to different edges of the transmissive medium.

Figure 5:
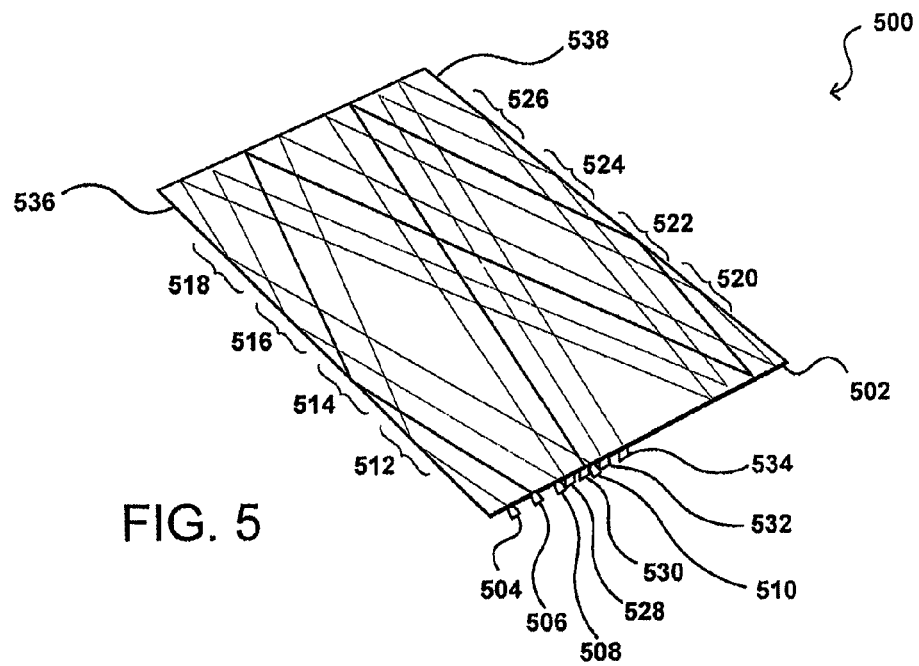
FIG. 5 illustrates a second configuration of light emitters and detectors for a display element that can be used in accordance with various embodiments.

FIG. 5 illustrates an alternative configuration 500 that can be used in accordance with various embodiments. In this example there is still a single set of light sources 504, 506, 508, 510 and a single set of light sensors 528, 530, 532, 534, as in the example of FIG. 3. In this case, however, the light from each of the light sources is configured such that the light reflects from multiple edges, sides, or other surfaces of the transmissive medium 502 before being received by at least one of the light sensors. For example, the light from a first source 504 reflects from a first region 512 on a first edge 536 of the medium then is reflected again (from two edges in this example) to a second region 520 on another edge 538, before being reflected to a first light sensor 528. In some embodiments where the user can provide the same input down either side 536, 538 based on the corresponding lateral position, the ordering of the reflection region 512, 514, 516, 518 for one side can correspond to the same ordering of light paths as the ordering 520, 522, 524, 526 on the opposite side. In this way, a reduction in intensity detected by any of the sensors provides an appropriate input, regardless of the side which the user touched. For example, the beam from source 506 reflects from regions 514 and 522, which correspond to the same approximate lateral position along the opposite edges of the transmission medium 502. A user thus can provide the same input using either side of the medium. In some embodiments, a user can provide "squeeze" or dual side input by pressing at the same lateral location on each side of the transmission medium 502. For example, the user could concurrently press on regions 518 and 526. The intensity measured by sensor 534 would then drop by more than if the user touched either region individually, as both regions would transmit some light due to the presence of a finger. Such an approach thus can provide an additional input by detecting where multiple fingers are touching.

In some embodiments, however, the light paths can be configured to reflect from different edges in different locations and/or orders. For example, a pair of light sources might be oriented such that the pair reflects from a first edge in a first order, such as the light from the first source being incident on the first edge before the light from the second source, but switched on a subsequent bounce, such that the light from the second source is incident on a second edge before light from the first source. Various patterns can be utilized to provide such changes in ordering as should be apparent to one of ordinary skill in the art in light of the teachings and suggestions contained herein. If there are enough light paths used that have different orderings on different sides, then the edge which the user touches can be determined by analyzing the relative drops in intensity of the different light paths. For example, if there are overlapping light paths from light sources 1, 2, and 3 in order 1-2-3 incident on a first edge, and order 1-3-2 incident on a second edge, the relative position and/or orderings can be used to determine which edge and location was contacted. If there is a drop in the light received from sources 1 and 3, for example, and the spread corresponds to a single finger, then it can be determined that the finger was at a location on the second edge where the light from sources 1 and 3 overlaps. Various other such approaches can be used as well within the scope of the various embodiments.

Figure 6:
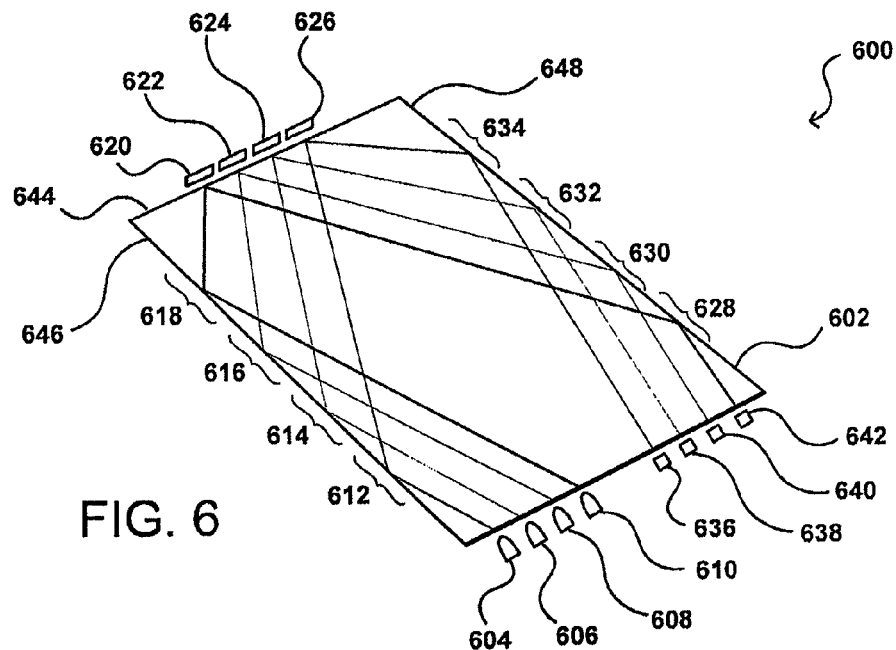
FIG. 6 illustrates a third configuration of light emitters and detectors for a display element that can be used in accordance with various embodiments.

In at least some embodiments where space is not as critical or the cost is not prohibitive, other approaches can be used that utilize additional light sources and/or light detectors. For example, FIG. 6 illustrates an example configuration 600 wherein the location on opposing sides 646, 648 on which a user touches can be determined using a single set of light sources 604, 606, 608, 610. In this example, however, the pattern is more simple due at least in part to the fact that a first set of sensors 620, 622, 624, 626 is used to measure intensity of light reflected from regions 612, 614, 616, 618 on a first edge 646 of the transmissive material 602, and a second set of sensors 636, 638, 640, 642 measures intensity of the light reflected from regions 628, 630, 632, 634 on the second edge 648. In at least some embodiments, the light incident on the edge 644 near the first set of sensors might not hit at an angle to cause total internal reflection. The edge 644 might have one or more optical elements or layers, such as one or more beam splitters or partially reflective mirror layers, contained within or attached to the edge such that a portion of the light from each source is transmitted by the edge 644, and a portion of the light is reflected back into the transmissive medium 602. In this way, light from a single set of sources 604, 606, 608, 610 can be used, which saves power versus multiple sets, but the light reflected from each monitored edge 646, 648 can be captured and analyzed using different sensors, enabling higher accuracy and a simpler light pattern.

Such an approach can also be less processor intensive than other approaches. For example, if the user touches the transmissive medium 602 at a first region 612 of a first side 646, the corresponding sensor 626 will detect a drop in intensity which can provide a quick and easy determination that the user contacted the edge at least partially within that region 612. If the user instead touched a similarly laterally located region 628 upon the opposing side 648, a corresponding drop in intensity would be detected by a different sensor 624. Such an approach thus can be more simple to implement and utilize in at least some situations than other approaches discussed herein. Further, the shorter path length needed to measure touch on opposing sides reduces losses and the likelihood of defects being present in the beam paths, such that accuracy can be further improved. As mentioned, however, such approaches can require more sensors or light sources, as well as more volume in the device, which may be undesirable in certain situations. As should be understood, various other light path patterns and combinations of radiation sources and radiation detectors can be used within the scope of the various embodiments.

Figure 7A:
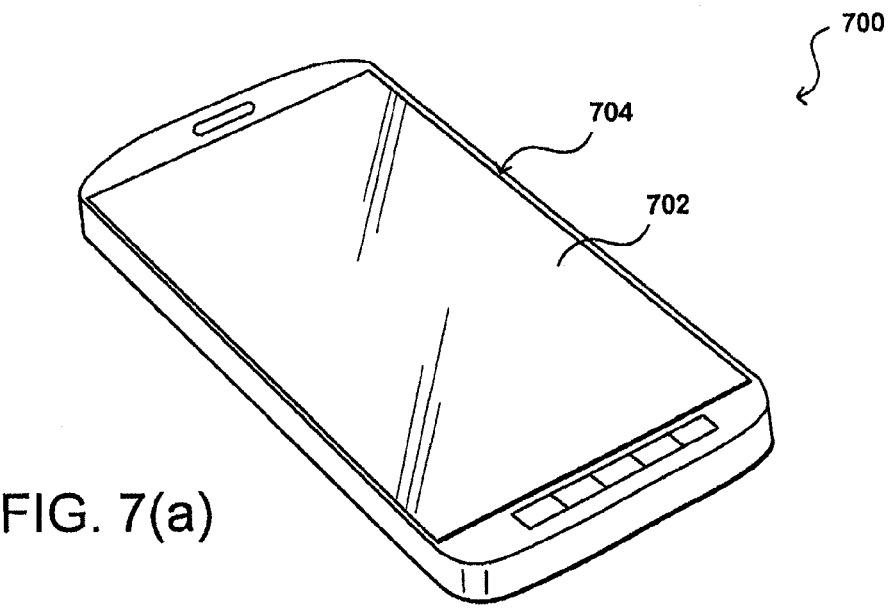
FIGS. 7(a) and 7(b) illustrate example computing devices that can be utilized in accordance with various embodiments.

In order to provide touch-based input using at least some of the approaches discussed above, the user should be able to touch at least a portion of one or more edges of a transmissive medium on a device. In some embodiments an entire edge might be positioned to be contacted by a user's finger, while in other embodiments enough of the edge must be contactable by a user's finger or other such object to cause at least a detectable change in intensity of light reflected from that edge. FIG. 7(a) illustrates a first example of a computing device 700 where a transmissive layer 702 of a display element of the device is used to enable touch input. In this example, at least one edge 704 of the transmissive layer is positioned near an edge of the device 700, such as within 2 mm of the edge of the device. Keeping the edge of the layer inset from the edge of the device can help to protect the transmissive layer, which can be more susceptible to damage than the edge of the device itself. In this example, the edges of the transmissive layer are covered by a portion of the casing that is deformable when a user presses a finger or other object against that portion of the casing. As discussed, the user can provide input by pressing on an appropriate region of the deformable casing, which in turn will contact the edge and cause a decrease in the intensity of light reflected from that location and detected by at least one corresponding sensor. Such an approach enables touch input while protecting the screen and preventing oil or other contaminants from collecting on the edge(s) of the transmissive layer.

Figure 7B:
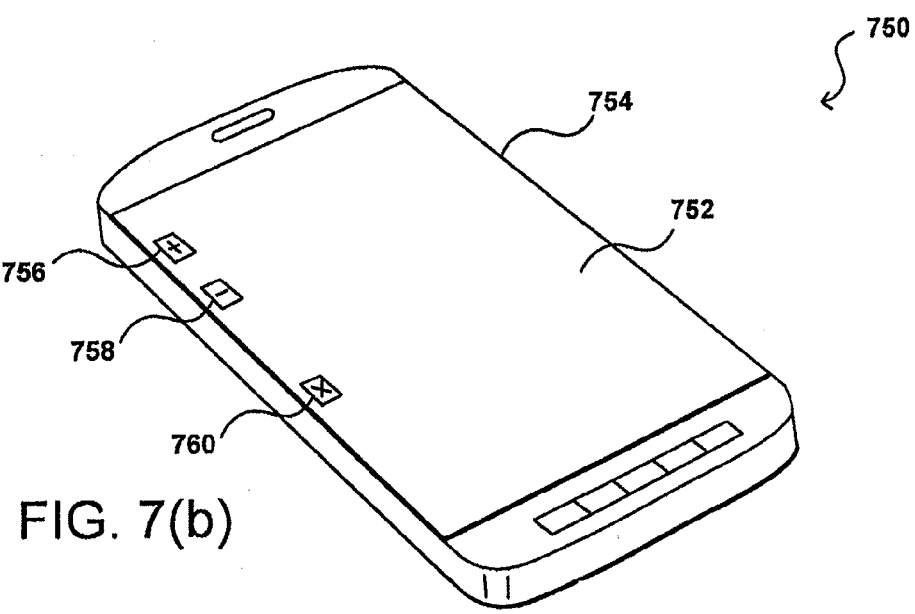

FIG. 7(b) illustrates another example computing device 750 enabling such input. In this example, however, the edge 754 of the transmissive material 752 monitored for touch input is flush with, or at least substantially close to, the edge of the computing device 750. Such an embodiment enables an entire edge of the material to be contacted by a user's fingers in at least some embodiments, which can provide for a greater measurable decrease in the reflected intensity. As discussed above, such designs also allow for input along at least two opposing sides of the devices, allowing for "squeeze" type input as discussed above, as well as potentially side-independent input as may be important for left vs. right hand dominant users. Also as illustrated in this figure, a computing device can be configured to display one or more graphical elements or other indicia on the display that is visible through the optically transmissive material. In this example, the graphical elements might be displayed when the device is in an active call mode, where a first element 756 is displayed near a region of the edge where a user is to touch or press to increase a call volume, a second element 758 is displayed near a region where the user is to touch or press to decrease a call volume, and a third element 760 is displayed to indicated to a user an area of the edge where the user can touch to hang up the call or perform a similar option. It should be understood that there can be any of a number of different elements displayed for any of a number of different functions, and that the selection can depend at least in part upon a current operational mode of the device, executing application, or other such aspect. In other embodiments, graphical icons might not be displayed, but visible light of one or more colors might be directed to different regions of the edge to assist with device operation and/or input determination by the user. In some embodiments, a portion of the edge will be frosted, ground, or otherwise processed to have a texture or roughness such that the light can be seen by a user when the light is incident upon that portion of the edge. The edge can also include another portion that might be substantially transmissive in order to allow for intensity change determinations as discussed elsewhere herein. In some embodiments, at least a portion of the edge might be beveled or otherwise shaped such that the colors can also be visible from a front or other direction with respect to the device.

Figure 8:
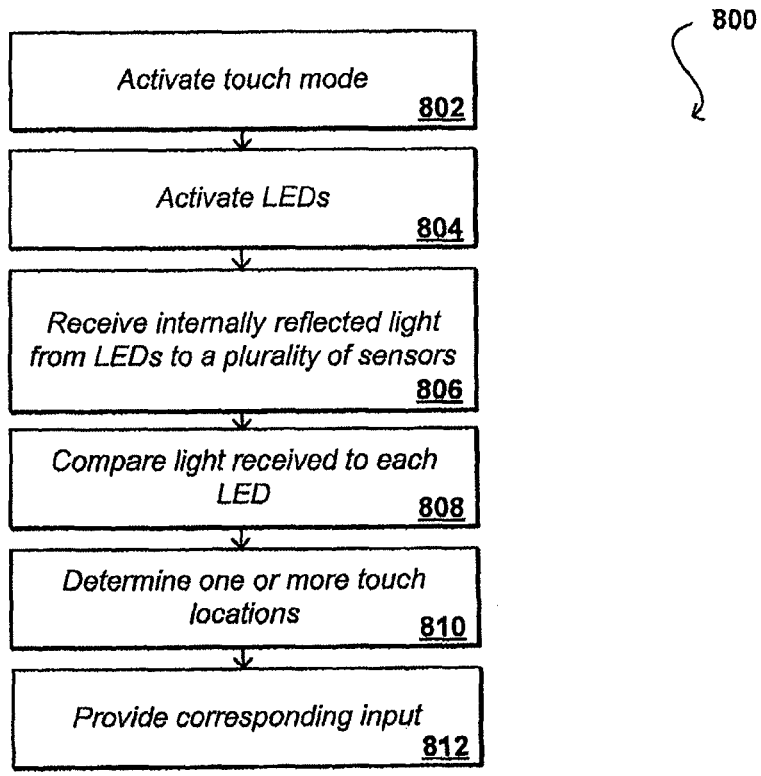
FIG. 8 illustrates an example process for determining one or more user touch locations that can be utilized in accordance with various embodiments.

FIG. 8 illustrates an example process 800 for determining touch input in accordance with various embodiments. It should be understood, however, that there can be additional, fewer, or alternative steps performed in similar or alternative orders, or in parallel, within the scope of the various embodiments unless otherwise stated. In this example, touch mode is activated 802 on a computing device. In some embodiments, touch mode can be active any time the device is active (and touch input is enabled by the user), upon the user manually activating touch mode, upon opening an appropriate application on the device, or upon any other such action or event. In some embodiments, touch mode might be activated upon detecting motion near the device, the presence of a user near the device, upon detecting a user gesture, or upon detecting the user picking up the device. Upon touch mode being activated, one or more LEDs or other such light sources can be activated 804 in order to provide the light needed for touch detection. As discussed, this can involve one or more light sources (and/or optical components) directing light into an at least partially transmissive material at an angle such that at least a portion of the light will be reflected from at least one edge or side of the transmissive material. The LEDs can be activated at any appropriate time, such as upon detecting motion, for a period of time after a determined action or event, periodically, or continually, among other times or approaches. The light reflected internally from one or more edges of the material can be received 806 by one or more light sensors, or at least portions, segments, or pixels of one or more light sensors. As mentioned, there might be a set of sensors along a single edge to monitor touches along one or more edges, or multiples sets of sensors each positioned to measure light from a respective edge position, among other possible configurations. The light received to each LED (or at least a relevant or respective portion of the LEDs) can be compared 808 and or analyzed to determine a relative intensity between sensors, an overall intensity pattern, light losses, or other such intensity information. Using any of the approaches discussed or suggested herein, the variations in received intensity among the various sensors can then be used to determine 810 one or more locations along at least one edge of the transmissive medium where the user contacted the medium with a finger or other such object. As discussed, various options exist that can enable multiple touch points or types of input to be detected and processed in accordance with the various embodiments. An appropriate input corresponding to the touch position(s) then can be determined 812, as may cause one or more appropriate actions to be performed on the computing device.

In many embodiments discussed herein, the touch locations are determined using a "loss" in the amount of light received to one or more of the sensors due to the presence of a human finger along an edge of a transmissive medium causing some of the light to be transmitted from the medium and absorbed by the user's finger. In at least some embodiments, the sources of this light could be modulated such that the sensors are looking for light at a particular pulsing frequency, such as pulsing frequencies in the range of 10 kHz to 1 MHz. If the sensors are able to sufficiently lock into that pulsing frequency, other light can be differentiated and discarded or used for filtering. This other light could be, for example, ambient light incident on the transmissive medium from the surrounding environment. In one embodiment, an LED is modulated to 200 kHz, and the receiving circuit is tuned to that modulation frequency as well in order to reject other light, such as may include ambient light or light from the display. In some embodiments, different LEDs can be modulated at different frequencies, with the sensors and/or receiving circuitry being modulated to corresponding frequencies such that light from different LEDs can be separated by modulation frequency even when those sources are received concurrently to the sensors, etc.

In some embodiments the LEDs can be pulsed for a very short burst at a determined frequency, which can significantly reduce the amount of power consumed. For example, if the LEDs are pulsing at 100 kHz then the photodiode reading circuitry might utilize a filter that only enables pulses at 100 kHz to pass. In addition to electronic filtering, some optical filtering may be employed, for example if IR LEDs are used the photodiodes might utilize relatively small filters that pass IR light but block visible light as might enter from the ambient lighting or from the display backlight. In some embodiments, the photodiodes can be AC coupled such that any DC component (i.e., resulting from the room light or daylight) is ignored. Further, the photodiodes can be very low power components such that use of low duty cycle modulation for the LEDs can help provide for a very low power device, in addition to the immunity to ambient light.

As mentioned, any or all of the edges of a transmissive layer or sheet, for example, can be exposed for contact by a human finger or other such object. In at least some embodiments, however, a casing material such as a rubber or polymer material can be placed around the edges that can be deformed due to pressure from a human finger. In some embodiments, the casing material might directly contact the edge of the transmissive layer, while in other embodiments a material of a selected refractive index can be positioned between the rubber and the edge to increase (or control) the amount of light transmitted. Such an approach would enable light to be coupled into, and absorbed by, the casing material without having to expose an edge of the transmissive layer to potential damage. In at least some embodiments, one edge might have a metallized barrier or other reflective material that helps to reflect the light back into the transmissive layer, such that the light does not have to be incident at a relatively oblique angle near the critical angle for TIR. The ability to require only one or two edges to have reflection at such oblique angles can simplify the pattern for the device.

In at least some embodiments, the angle of the transmitted light can be configured to be incident upon at least one edge of the transmissive material at almost exactly the critical angle whereby the light undergoes total internal reflection. Such an approach enables the device to be very sensitive to contact or other changes in external atmosphere. Such an approach can be potentially problematic in some situations, however, as slight misalignments can cause the light to be more likely to be unintentionally transmitted by the edge, and any collection or oil, dirt, or other contaminants on the surface can cause an appreciable amount of light to be lost via the interface, although periodic calibration and/or adjustment can handle relatively slow variations in reflected intensity over time. In at least some embodiments, a touch detection algorithm is not searching for an absolute intensity threshold value but a relative threshold value indicating contact, such that the long term averages or other adjustments can handle many issues with contamination, oil accumulation, and the like.

As discussed, the light paths are illustrated in the figures as collimated beams, but it should be understood that the light can actually fan out into broader spreads with propagation distance. Additional optical elements can be used where desired to attempt to adjust or control the amount of spread of the various light paths. Further, the amount of light sources and/or detectors used can vary with the amount of spread as well, particularly the amount of spread with respect to the size of each edge, path length, and other such factors. For example, in some embodiments four LEDs might be sufficient to cover an entire edge, with a significant amount of overlap. The number of detectors used can depend at least in part upon the sensitivity of the measurements, as differences in adjacent intensity measurements can be used to interpolate touch position to the accuracy of the number of detectors, pixels, or segments of those detectors, etc. In most cases the detectors or sensors will get some amount of overlap from multiple light sources, which helps with interpolation and touch location determination. The use of a multiplexing scheme as discussed herein further provides accurate position and side information by examining the losses of adjacent beams, etc.

Other factors can affect the number of light sources and/or detectors as well. For example, different use cases might require different touch locations and/or levels of sensitivity. If a user wants to provide input using one or more fingers detected in specific locations along a side, then a relatively small number of light sources and detectors might be appropriate. If a user wants to be able to scroll down a page, zoom an image, or adjust a volume with a swiping motion, then a relatively small number of light sources and detectors might not provide enough information and might result in a jumping or jerking motion that is not smooth or continuous, such that a larger number of light sources (e.g., 8 or 16) might be appropriate and sufficient for adequate interpolation determinations. Complex interpolation schemes might be able to be used with a smaller number of light sources, but the delay and processing demands might be too great for at least some situations.

As mentioned, the light sources can be discrete sources or part of a single component. For example, a package to be added to a computing device might include multiple LED elements and pin photodiodes placed on a substrate such as a board or flex. Such a package then can be adhered to, or otherwise positioned with respect to, an edge of the transmissive material. In one embodiment, an optical layer of a display element is 0.5 mm thick such that the board with the LED elements can also be approximately 0.5 mm wide, with a thickness on the order of a flex and the height of a die, where a die is about 100 microns thick. The package can be positioned along an entire edge, or at least a portion of a bottom edge, of the transmissive medium, where utilizing the entire edge can help to reduce potential alignment issues. There also can be varying amount of interleaving of LEDs, photodiodes, and other such components in the various embodiments.

The timing of the various light sources can also be adjusted, varied, and/or controlled differently among various embodiments and/or for various use cases. For example, LEDs may not need to be flashed at the same time but can be flashed in sequences of various orders. Flashing at the same time might result in cross-talk or other such issues for at least some embodiments, such that it can be preferable to flash each light source separately and examine the corresponding flash at each photodiode. Since the beams might spread to multiple photodiodes, such an approach can help to better determine an amount of intensity decrease corresponding to different regions of the light path, which can help improve interpolation when combining results from the various photodiodes. The flashing frequency can be very fast, such as on the order of microseconds, such that there might be no noticeable delay on the part of the user. The flashing frequency can be selected so as to not interfere with other components on the device, such as a camera or radio frequency component.

In some embodiments, a computing device can detect when a device is being picked up and/or held using any appropriate component(s), such as an inertial sensor or accelerometer, electronic gyroscope, touch sensitive material, and the like. When the device determines it is being held, for example, the device can determine a baseline intensity pattern corresponding to a time when the user is not contacting an edge of the transmissive material. When the user then contacts an appropriate edge, the difference in intensity can be determined relative to that baseline under current conditions. Further input can be determined based upon the way in which the intensity pattern changes. For example, a user tapping a location will provide a very easy to distinguish change in the intensity pattern with distinct loss variations. A user might tap to perform an action such as to take a picture or select an item. A user also might slide a finger along a portion of an edge to, for example, zoom in or out in an image viewing application, which can also provide a distinguishable change in the detected intensity pattern. Various other motions, gestures, or actions can provide distinguishable intensity pattern changes as well.

In at least some embodiments the touch detection can further be used to at least partially identify or authenticate a user of the device. For example, a user might typically contact the edges of the device in a certain way, such as with a certain separation of finger touch positions based on the way the user holds the device and/or physical aspects of the user's fingers. Similarly, the size of a user's fingers can cause a certain range of intensity changes due at least in part to the amount of edge area that can be contacted by that user's finger. By monitoring the way in which a user contacts the device, the device can provide a first level of security as to whether the current user matches the expected user or at least an authorized user.

In some embodiments, a more accurate identity authentication mechanism can be provided. One such approach takes advantage of the fact that the user can be required to touch the sides of the transmissive material with at least one finger to provide certain types of input in at least some embodiments. Various conventional devices such as certain fingerprint scanners utilize TIR to determine fingerprint information using an oil pattern on glass. By building on these conventional approaches, fingerprint scanning can also be implemented in a touch determination capable device. In one example, a light source such as a laser can be used to direct light to at least one location on an edge of the device. A user can swipe, roll, or perform another such action with the user's finger on an edge of the device, and a laser diode or other such component having light reflected from that region using TIR can potentially be used to determine at least a portion of a fingerprint using various diffraction effects. Various points can be determined in Fourier transform space of the reflected and diffracted beam with the features of the fingerprint forming a unique grating pattern on the frustrated reflection, or using a similar approach, which then can be compared against stored fingerprint pattern information for a user. Methods of matching fingerprints using such information are known in the art and will not be discussed in detail herein. Such approaches could be used to identify a user, provide for a secure device unlock without password entry, etc. In some embodiments, the laser could be fired upon certain verification procedures, at various points in the LED flashing sequence, etc. When analyzing fingerprints, a single bounce configuration might be advantageous where the emitted light is only reflected from a region where the user might place his or her finger, then is received by a sensor without reflecting from another surface. In some embodiments, only a portion of an edge might be exposed that is used to detect the reflected laser light.

As mentioned, the pressure of a touch can be determined in addition to the localization of that touch by quantifying the light lost. Further, multiple concurrent touches or touch motions can be determined for one or more edges. Various approaches known for such optical purposes can be used to reduce noise and background signal and increase signal-to-noise ratio and sensitivity. For example, the LEDs can be modulated on and off, with the readings at the off stage being averaged and then subtracted from the on state readings.

In some embodiments a device design can be configure to radius the edge of the device. Such an approach not only prevents sharp edges that the user might contact, but also can make better use of the emitted light. In some embodiments the edge of the phone could be scalloped as well, having several small formations with small radii. Such an approach could potentially improve the quality of the light with every bounce, and can help to re-collimate the beams based at least in part upon the radius of a respective feature and the amount of beam spread.

Figure 9:
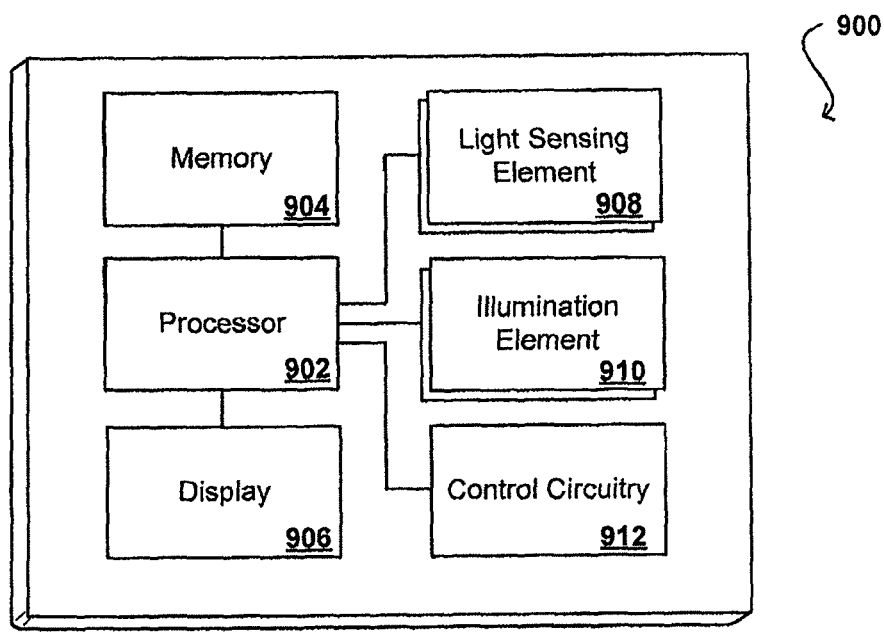
FIG. 9 illustrates an example set of components that can be utilized in a device such as that illustrated in FIG. 7(a) or 7(b)

FIG. 9 illustrates a set of basic components of an example computing device 900 such as the devices described with respect to FIG. 1(b). While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes at least one processor 902 for executing instructions that can be stored in a memory device or element 904. As known in the art, the device can include many types of memory, data storage or non-transitory computer-readable storage media, such as a first data storage for program instructions for execution by a processor 902, a separate storage for images or data, a removable memory for sharing information with other devices, etc.

The device typically will include at least one type of display element 906, such as a liquid crystal display (LCD), organic light-emitting diode (OLED) display, a plasma display, or a digital light processing (DLP) display, as discussed herein. The display element can include at least one transmissive layer, element, or component that is at least partially exposed to contact by a user. The transmissive element cell can be selected such that the element does not absorb an appreciable amount of light or IR radiation, such that the element can enable transmission of a displayed image as well as propagation of radiation used to provide touch input, which might be in a direction transverse to that of the light for image display. As mentioned, the device can include one or more illumination elements 910, such as IR LEDs, laser diodes, or other such components, positioned with respect to the transmissive element of the display 906 such that at least a portion of the light or radiation transmitted into an edge of the transmissive element is incident upon at least one internal edge of the transmissive medium so as to undergo total internal reflection at least when the interface of that edge is with ambient air or another such environment. The generation and timing of the radiation emission from the illumination element(s) 910 can be controlled using various control circuitry including components known and configured for purposes such as pulsing LEDs. At least a portion of the internally light or radiation then can be detected by one or more light or radiation sensing elements 908, such as IR sensors or light detectors, photodiodes, and the like. In at least some embodiments, illumination elements 910 and light sensing elements 908 are configured to handle IR radiation over an appropriate wavelength, such as 940 nm or other wavelengths above 900 nm. The detectors can be any appropriate detectors, such as CMOS sensors operable to detect radiation in a wavelength range of at least, for example, 910 nm to 970 nm. In embodiments using multiple IR LEDs, the LEDs can be scanned in sequence for some applications in order to reduce power consumption or simplify touch location determination. For other applications, various subsets of the IR LEDs can be used at different times in order to illuminate various portions or regions, etc.

An example computing device also can include other components, such as at least one motion-determining element (e.g., an accelerometer or gyro element) that can be used to determine motion of the device, which can be used to trigger or adjust a touch input mode as discussed elsewhere herein. The device can also include at least one image capture element for capturing ambient light image information about the user of the device. The imaging element may include, for example, a camera, a charge-coupled device (CCD), a motion detection sensor, or a radiation sensor, among many other possibilities.

The device can support other types of input as well. For example, the device can include a touch- and/or pressure-sensitive element around at least a portion of the device, such as on the back and/or sides of the device. Using such material, the device is able to determine whether a user is actively holding the device and/or can enable the user to apply input by squeezing at least a portion of the device. The input information could be used to trigger a detection mode or other such process. The device can also include a microphone or other such audio-capturing device. The device in at least some embodiments can trigger various actions or modes based upon sound detected by the microphone. For example, if the device detects speech from a person, the device might activate a detection mode to enable that person to provide motion input. The device can include at least one additional input device able to receive conventional input from a user. This conventional input can include, for example, a push button, touch pad, touch-sensitive element used with a display, wheel, joystick, keyboard, mouse, keypad or any other such device or element whereby a user can input a command to the device.

In some embodiments, one or more icons or other notifications might be displayed on the device to indicate to the user that IR illumination is active, or that touch determination is being performed. In some embodiments, a light (e.g., LED) on the device might illuminate in order to notify the user that touch detection is activated in order to signal to the user that the user can provide input via various motions or finger positions. Various other notifications can be used as well as appropriate.

Figure 10:
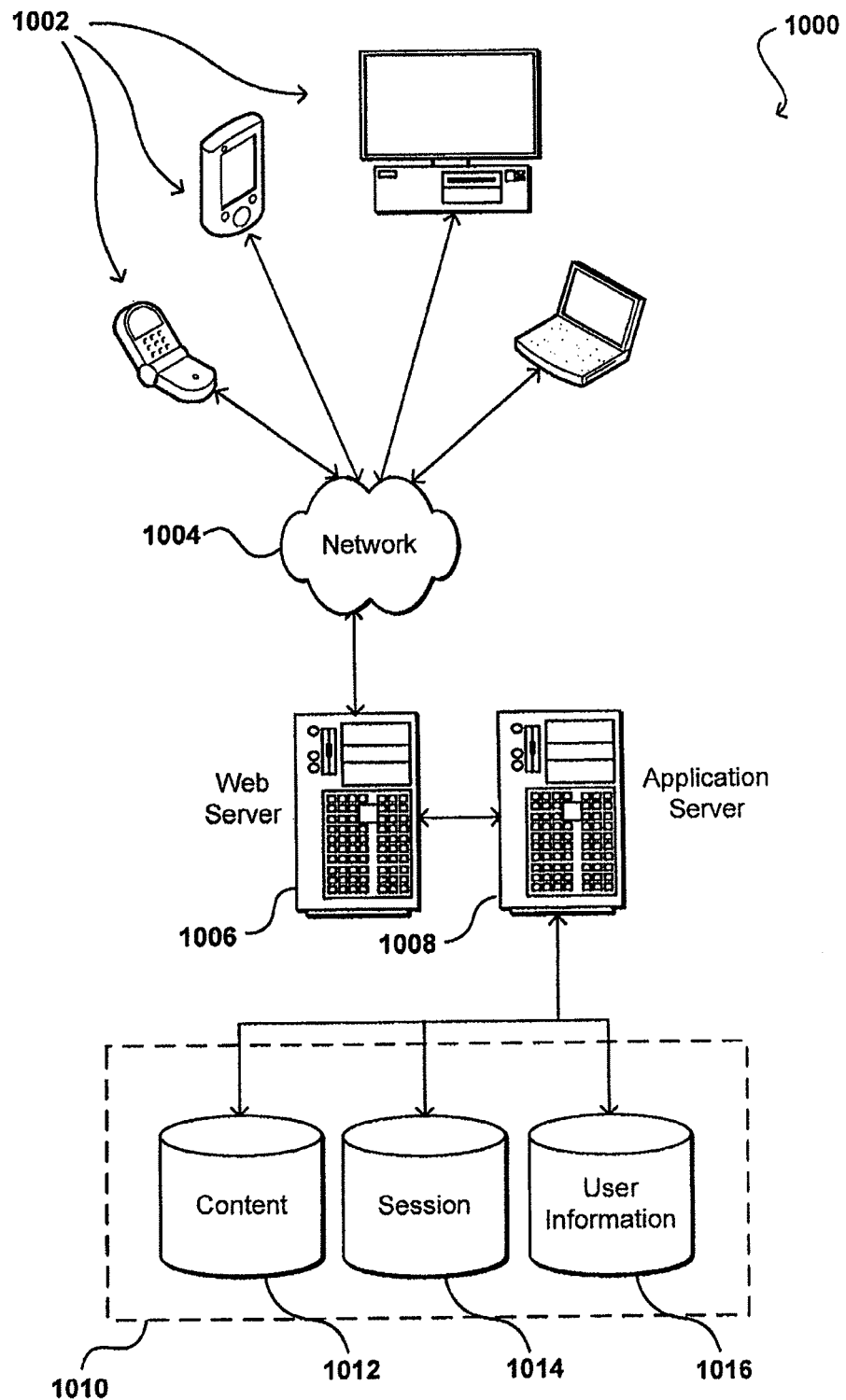
FIG. 10 illustrates an example an environment in which various embodiments can be implemented.

A computing device used for such purposes can operate in any appropriate environment for any appropriate purpose known in the art or subsequently developed. Further, various approaches discussed herein can be implemented in various environments for various applications or uses. Portions of the analysis also can be sent or offloaded to remote devices which might have more available resources and/or capacity. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The environment 1000 shown includes a variety of electronic client devices 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 1004.

The network 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 1006 and a supplemental content provider 1008. Each provider can include at least one Web server 1006 for receiving requests from a user device 1002 and serving content in response thereto, although for other networks an alternative device serving a similar purpose could be used as would be apparent to one of ordinary skill in the art.

Each content provider in this illustrative environment includes at least one application server 1012, 1014, 1022 or other such server in communication with at least one data store 1016, 1018, 1024. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 1016 illustrated includes mechanisms for storing page data useful for generating Web pages and the user information data store 1018 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 1002. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a liquid crystal display (LCD) element including an optically transmissive layer having at least one side surface being substantially orthogonal with respect to an exposed front surface of the LCD, the side surface at least partially exposed, the side surface further being configured to receive a user input corresponding to a finger of the user contacting the side surface;
   an infrared (IR) light emitting diode (LED) positioned to direct IR radiation into the optically transmissive layer such that at least a portion of the IR radiation from the LED incident on an internal surface of the at least one at least partially exposed side surface of the optically transmissive layer undergoes total internal reflection (TIR) when the at least one at least partially exposed side surface is not in contact with a finger of a user;
   at least one IR detector operable to detect IR radiation reflected by the internal surface of the at least one at least partially exposed side surface and transmitted through at least one side surface of the optically transmissive layer; and
   a processor configured to execute instructions to
   analyze the detected IR radiation to determine variations in a measured intensity of the IR radiation, the processor further operable to determine a reflection position corresponding to a decrease in the measured intensity, the decrease in the measured intensity at the reflection position being indicative of the finger of the user contacting the at least one at least partially exposed side surface at the reflection position when the decrease in the measured intensity with respect to a default measured intensity at least meets a threshold value.

2. The computing device of claim 1, further comprising:
   a control circuitry in electronic communication with the processor and operable to selectively activate the IR LED in response to a control signal from the processor.

3. The computing device of claim 2, wherein the IR LED is one of a plurality of IR LEDs, and wherein the control circuitry is programmed to activate the plurality of IR LEDs individually in sequence whereby the at least one IR detector is capable of distinguishing light from each of the plurality of IR LEDs.

4. The computing device of claim 3, wherein the processor is operable to perform interpolation on intensity measurements for the plurality of IR LEDs to determine at least one position of an object in contact with the at least one at least partially exposed side surface of the optically transmissive layer causing a reduction in the measured intensity.

5. The computing device of claim 1, wherein the at least one IR detector comprise a first set of IR sensors operable to detect a first portion of the IR radiation reflected from a first internal surface and a second set of IR sensors operable to detect a second portion of the IR radiation reflected from a second internal surface.

6. The computing device of claim 1, wherein multiple IR radiations from the IR light emitting diode are directed into the optically transmissive layer, and wherein beams of IR radiation from the IR light emitting diode are incident on a first internal surface in a different order than the beams are incident on a second internal surface.

7. A computing device comprising:
a processor;
a liquid crystal display (LCD) element including an optically transmissive element having at least one side surface being substantially orthogonal with respect to an exposed front surface of the LCD, the side surface at least partially exposed, the side surface further being configured to receive a user input corresponding to a finger of the user contacting the side surface;
a light source positioned to direct light into the optically transmissive element such that at least a portion of the light incident on an internal surface of the at least one at least partially exposed side surface of the optically transmissive element undergoes total internal reflection (TIR) when the at least one at least partially exposed side surface is not in contact with the finger of the user;
a set of light sensors positioned to receive light reflected by the internal surface of the at least one at least partially exposed side surface and transmitted through at least one side surface of the optically transmissive element after undergoing total internal reflection for at least one side surface of the optically transmissive element; and
a memory device including instructions that, when executed by the processor, cause the computing device to:
measure an intensity of light reflected from multiple positions along the at least one side surface of the optically transmissive element;
determine a baseline intensity profile for the computing device when the at least one side surface is not in contact with the finger of the user;
monitor changes in the intensity of light detected by the set of light sensors;
in response to a decrease in intensity of light reflected from one of the multiple positions with respect to the baseline intensity profile, determine the user input corresponding to the one of the multiple positions; and
process the user input using the processor.

8. The computing device of claim 7, further comprising:
a display component viewable through the exposed front surface of the optically transmissive element.

9. A system for receiving a user input, comprising:
a processor;
a liquid crystal display (LCD) element including an optically transmissive element having at least one side surface being substantially orthogonal with respect to an exposed front surface of the LCD, the side surface at least partially exposed, the side surface further being configured to receive the user input corresponding to a finger of the user contacting the side surface;
a light source positioned to direct light into the optically transmissive element such that at least a portion of the light incident on an internal surface of the at least one at least partially exposed side surface of the optically transmissive element undergoes total internal reflection (TIR) when the at least one at least partially exposed side surface is not in contact with the finger of the user;
a set of light sensors positioned to receive light reflected by the internal surface of the at least one at least partially exposed side surface and transmitted through at least one side surface of the optically transmissive element after undergoing total internal reflection on the internal surface of the at least one at least partially exposed side surface; and
a memory device including instructions that, when executed by the processor, cause the system to:
analyze the detected light to determine variations in a measured intensity of the light, the processor further operable to determine a reflection position corresponding to a decrease in the measured intensity, the decrease in the measured intensity at the reflection position being indicative of the finger of the user contacting the at least one at least partially exposed side surface at the reflection position when the decrease in the measured intensity with respect to a default measured intensity at least meets a threshold value.

* * * * *